May 22, 1951  J. O. KAVANAGH  2,554,412
COOKING UTENSIL
Filed July 17, 1946  2 Sheets-Sheet 1

Inventor
JAMES O. KAVANAGH
Cushman, Darby & Cushman
Attorneys

May 22, 1951     J. O. KAVANAGH     2,554,412
COOKING UTENSIL
Filed July 17, 1946     2 Sheets-Sheet 2
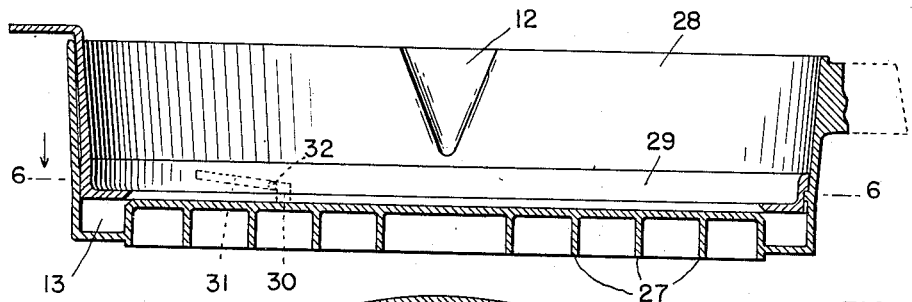
FIG. 5.
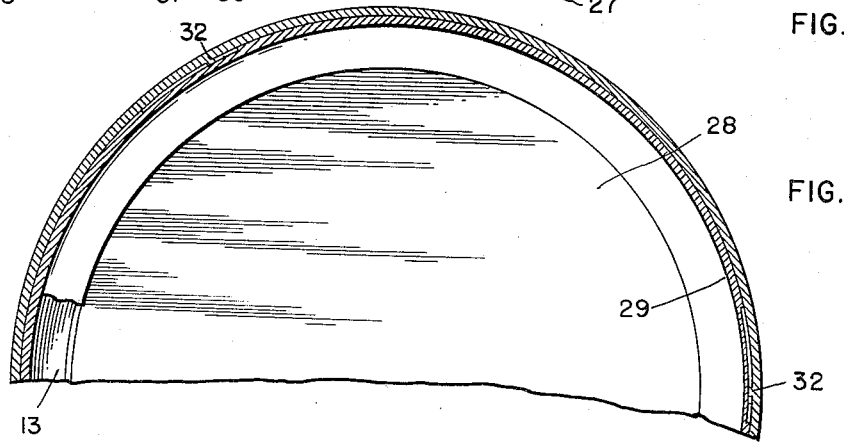
FIG. 6.
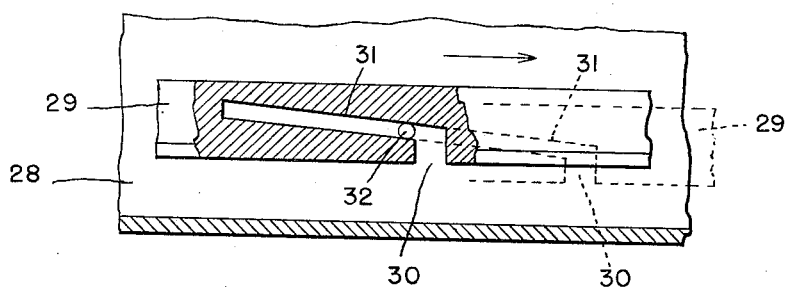
FIG. 7.
FIG. 8.     FIG. 9.
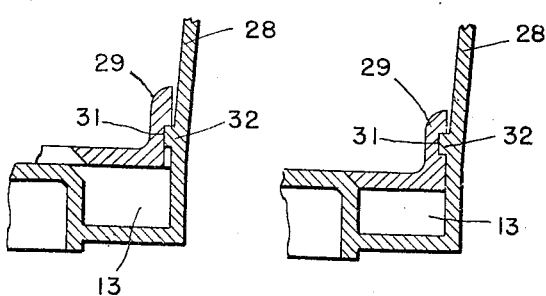
Inventor
JAMES O. KAVANAGH
Cushman, Darby & Cushman
Attorneys Patented May 22, 1951

2,554,412

UNITED STATES PATENT OFFICE 2,554,412

COOKING UTENSIL

James O. Kavanagh, South Norwalk, Conn., assignor to Sputterless Pan Company, Norwalk, Conn., a corporation of Connecticut Application July 17, 1946, Serial No. 684,106

7 Claims. (Cl. 99—425)

This invention relates to cooking utensils. It has for its object the provision of a utensil in which sputtering and scattering of hot grease or juices from the food being cooked is eliminated or substantially minimized.

The present case is a continuation in part of and is substituted for application Serial No. 650,893, filed February 28, 1946, now abandoned.

As here disclosed, the invention is shown applied to a frying pan, but it will be understood that this disclosure is merely illustrative, and in no sense restrictive, as the invention is applicable to a variety of utensils.

In the drawings herewith, forming part of this disclosure:

Figure 5 is a view in cross-section showing a slightly different construction.

Figure 6 is a plan view of a portion of the utensil shown in Figure 5.

Figure 7 is an enlarged detail sectional view to show a different form of coupling between pan and ring.

Figures 8 and 9 are enlarged detail cross sections of the pan and ring, showing the ring in different positions of adjustment.

Figure 1:
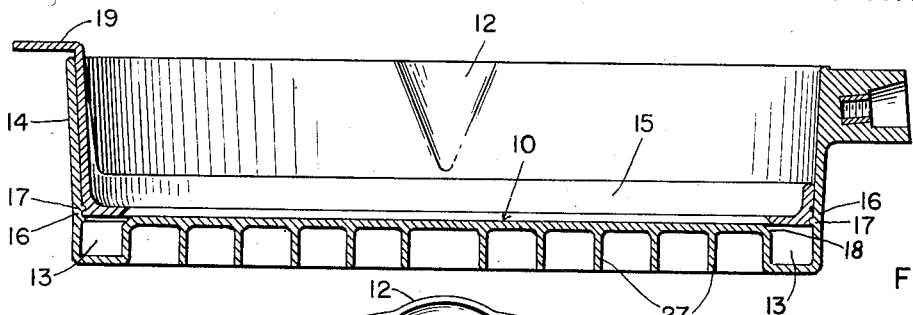
Figure 1 is a view in cross-section of a utensil embodying my invention.
Figure 2:
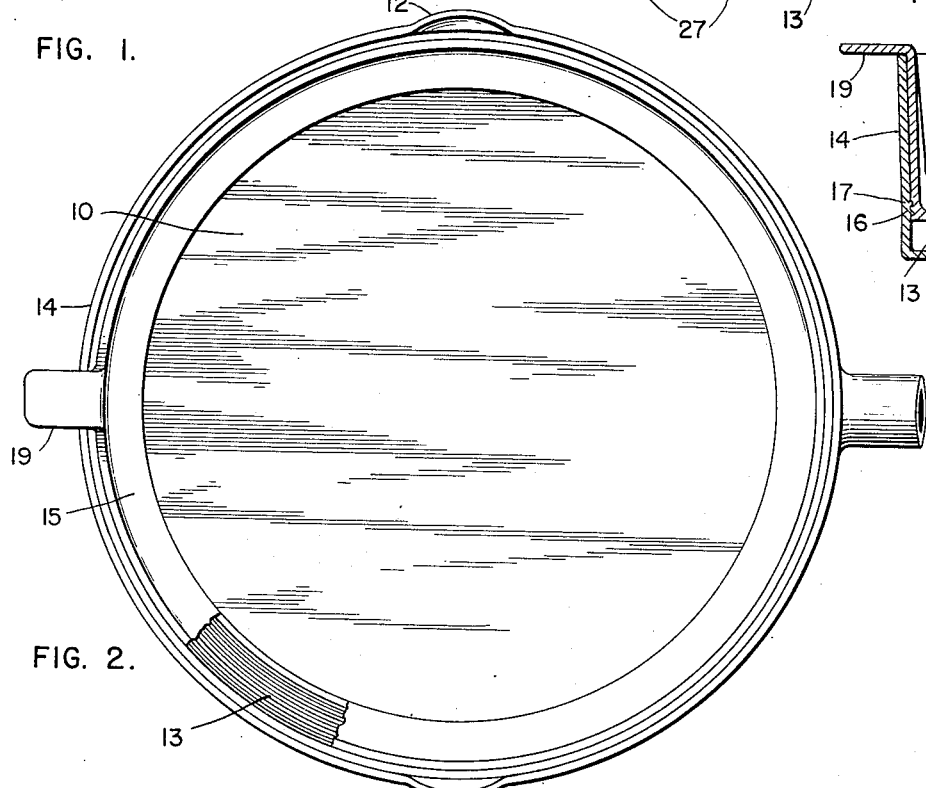
Figure 2 is a plan view of the utensil shown in Figure 1.

Referring to the drawings by numbers, like numbers designating like parts in the several views, the utensil 10 may be of any desired type. A round frying pan is here shown, provided with a central pan portion, the usual handle portion and pouring spouts 12. It will be understood that the invention is applicable to utensils of shapes other than round. Pan 10 is provided with a peripheral trough 13, here shown as formed by depressing by spinning, stamping, casting, or any other suitable manner, a portion of the bottom of the pan adjacent the pan rim 14. This provides a utensil having the usual bottom and rim with a trough in the bottom between the central pan portion and the rim, preferably close to the rim. The purpose of the trough 13 is to form a receiving well into which grease or juices of any kind coming from the food being cooked, may flow from the pan bottom. Such grease or juice can, of course, be returned to the cooking area in such quantity as may be desired by tilting the pan and letting the collected contents of the groove run out into the cooking area.

Figure 3:
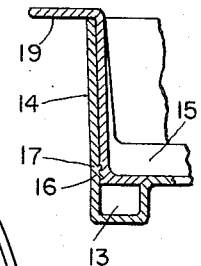
Figure 3 is a detail of the ring in its lowest position.

In order that the collected liquid in trough 13, which is hot and sputtering, may be prevented from scattering, the trough 13 is covered by a spatter ring or band 15, so that sputtering contents of the trough 13, sputtering under heat, will be prevented from scattering, the ring 15 forming a barrier to any upward sputtering of the contents of trough 13. Ring 15 is preferably L-shaped in cross-section to give it rigidity and prevent its warping under heat, and the outer wall of the ring 15 bears closely against the rim 14 of the pan. The inside surface of the outer wall of the trough 13 and the outer edge of the ring 15 have complementary means, shown in Figures 1 and 3, as screw threads 16 and 17, to permit vertical adjustment of said ring. When the ring 15 is adjusted downwardly to its lowest position, as shown in Figure 3, it forms a part of the bottom of the utensil which, in such condition, presents a complete unbroken bottom, and can be used as an ordinary utensil and there will be no drainage to trough 13. When ring 15 is adjusted upwardly as shown in Figure 1, there will be drainage space between the ring and the bottom so that the grease may flow to the trough. Such space may be varied to some extent by raising or lowering the ring 15. Preferably the edge of the bottom adjacent the trough 13 will be bevelled or chamfered off, as at 18, to give proper clearance and ensure easy flow of the grease to the groove 13.

In order that ring 15 may be readily manipulated and shifted to its different positions, or removed from the pan for cleaning or any other purpose, a vertically disposed handle 19, preferably integrally formed with the ring 15, may be provided, so that the user may position the ring and adjust it vertically, the adjustment as here shown being by means of a screw thread connection. It will be understood that other and equivalent means of adjustment may be adopted.

With this construction, a utensil is provided which may be used as a plan cooking pan, or converted to a grease or juice collecting pan which will guard against sputtering and scattering of hot contents.

Figure 4:
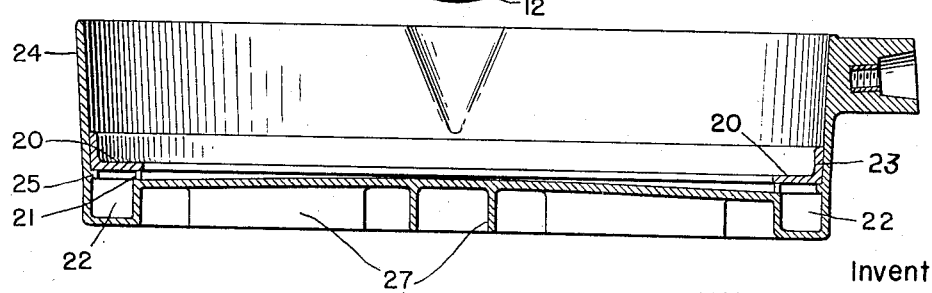
Figure 4 is a view in cross-section of a utensil of slightly modified construction.

In the form of the invention shown in Figure 4, a slightly modified ring construction is shown. In this form the ring 20, substantially L-shaped in cross-section, has supporting legs 21, three such legs being preferable for stability of the ring when placed in the pan. The legs 21 are at the inner periphery of ring 20 and rest upon the bottom of the pan, just inside the liquid collecting trough 22. The outer vertical wall 23 of the ring bears with a close fit against the inner wall of the pan rim 24, and there may be provided a rib 25 on the inner wall of said rim which will support the ring 20 as its outer periphery. With this construction, the ring 20 is spaced sufficiently from the pan bottom to provide for drainage from the pan bottom to the trough 22, which groove will be spun or stamped from the bottom in the same manner as heretofore described the central pan portion may, as shown, be slopped from its center outwardly to its rim to facilitate drainage.

In Figures 5 to 9, inclusive, is shown a modified form of coupling the ring and the pan. In this form of the invention the pan 28 and ring 29 will be generally the same as heretofore described. Instead of the screw-threaded coupling between pan and ring, as shown in Figures 1 and 3, a bayonet joint coupling is shown. Preferably, and as here shown, the bayonet slots will be formed in the vertical wall of the ring 29 and is made up of the open-mouth portion 30 and the channel 31 extending from the mouth 30. As here shown, the channel 31 is inclined upwardly in order to permit the ring 29 to be adjusted to different vertical positions, as will be presently described. The bayonet slots thus formed may be any number desired, three being a desirable number, and they are designed to engage a corresponding number of projections or pins 32 on the inside of the vertical wall of pan 28. This construction gives a simple, readily formed and easily manipulable coupling and one not likely to become injured or deranged in ordinary usage. It permits vertical adjustment of ring 29 relative to the pan 28, as shown in Figures 7, 8, and 9, so as to put them in open position for drainage into the pan trough, as shown in Figure 8, or in closed position, as shown in Figure 9. As will be clear from Figure 7, also Figures 5 and 8, ring 29 is shown in its elevated position so as to provide for drainage to the peripheral grease-holding trough 13 of the pan 28. Rotating ring 29 in the direction of the arrow, Figure 7, will cause the inclined channel 31 to ride down on pins 32, thus causing ring to be lowered to position shown by Figure 9 and by the dotted lines in Figure 7. Ring 29 will then be in its lowest position and flush with the pan surface, as shown in Figure 9. By reason of the length and inclination of the channel 31 of the bayonet slot, it will be obvious that the drainage space between ring 29 and the pan bottom may be varied to a considerable degree to meet various cooking conditions and permit full or limited drainage from the pan to the peripheral grease-holding trough.

The bottom of the pan inside the troughs 13 and 22 is preferably provided with depending ribs 27, as shown in Figures 1 and 4, of any suitable design, which serve to support the pan on the stove or burners. These depending ribs serve also to reinforce the bottom of the pan to prevent warping. At the same time, a greater heat absorbing area is provided. The ribs here shown as concentric rings are made of the same or slightly greater depth than the trough, in order that the weight of the utensil and its contents will not be imposed on the depressed trough which forms the groove.

This disclosure will suggest to other structural variations, which do not depart from the principle of the invention, and such departures as involve only the exercise of mechanical skill and are comprehended by the appended claims, which define the invention, are to be regarded as within its range.

I claim:

1. A cooking utensil comprising a central pan portion, a peripheral rim disposed around said pan portion, a peripherally disposed trough projecting downwardly from and in drainage communication with said pan portion and located between said pan portion and said rim, a peripherally disposed spatter-preventing member covering said trough, and means for adjustably securing said member at any predetermined one of a plurality of several selectable positions at different heights above said trough.

2. The combination set forth in claim 1 wherein said securing means comprises coacting screw threads on said member and said rim.

3. The combination set forth in claim 2 having a handle secured to said member whereby the latter may be rotated so as to adjust the height of the member above the trough.

4. The combination set forth in claim 1 wherein said securing means comprises a bayonet joint coupling between said member and said rim.

5. The combination set forth in claim 4 having a handle secured to said member whereby the latter may be rotated so as to adjust the height of the member above the trough.

6. The combination set forth in claim 1 wherein said member is substantially L-shaped in cross-section and comprises an upwardly-directed portion bearing against said rim and a horizontally-disposed portion at least partially covering said trough.

7. A cooking utensil comprising a central pan portion, a peripheral rim disposed around said pan portion, a peripherally disposed trough projecting downwardly from and in drainage communication with said pan portion and located between said pan portion and said rim, a peripherally disposed spatter-preventing member covering said trough, and mounting means comprising coacting screw threads on said member and said rim for maintaining said member at a fixed height above and spaced from said trough so as to permit drainage from said pan portion to said trough.

JAMES O. KAVANAGH.

REFERENCES CITED

The following references are of record in the file of this patent:

UNITED STATES PATENTS

| Number | Name | Date |
|---|---|---|
| 1,224,731 | Fournier | May 1, 1917 |
| 1,276,749 | George | Aug. 27, 1918 |
| 1,467,272 | Hazelhurst | Sept. 4, 1923 |
| 1,733,450 | Detwiler | Oct. 29, 1929 |
| 1,956,387 | Hartman | Apr. 24, 1934 |
| 2,012,520 | Rogers | Aug. 27, 1935 |

FOREIGN PATENTS

| Number | Country | Date |
|---|---|---|
| 17,057 | Great Britain | July 25, 1907 |
| 27,318 | Great Britain | Mar. 19, 1908 |
| 41,102 | Switzerland | Jan. 4, 1908 |